United States Patent
Cimatti

(10) Patent No.: US 11,027,770 B2
(45) Date of Patent: Jun. 8, 2021

(54) STEER BY WIRE ROAD VEHICLE STEERING SYSTEM PROVIDED WITH A TELESCOPIC SUPPORT ELEMENT FOR THE STEERING WHEEL

(71) Applicant: FERRARI S.p.A., Modena (IT)

(72) Inventor: Franco Cimatti, Pavullo (IT)

(73) Assignee: FERRARI S.P.A., Modena (IT)

(*) Notice: Subject to any disclaimer, the term of this patent is extended or adjusted under 35 U.S.C. 154(b) by 267 days.

(21) Appl. No.: 16/171,443

(22) Filed: Oct. 26, 2018

(65) Prior Publication Data
US 2019/0135332 A1    May 9, 2019

(30) Foreign Application Priority Data
Oct. 26, 2017   (IT) .................. 102017000121876

(51) Int. Cl.
| | |
|---|---|
| *B62D 5/04* | (2006.01) |
| *B62D 1/181* | (2006.01) |
| *B62D 5/00* | (2006.01) |
| *B62D 1/10* | (2006.01) |
| *B62D 6/10* | (2006.01) |
| *G01L 5/22* | (2006.01) |

(52) U.S. Cl.
CPC ........... *B62D 5/0409* (2013.01); *B62D 1/105* (2013.01); *B62D 1/181* (2013.01); *B62D 5/001* (2013.01); *B62D 5/006* (2013.01); *B62D 5/0403* (2013.01); *B62D 5/0454* (2013.01); *B62D 5/0481* (2013.01); *B62D 6/10* (2013.01); *G01L 5/221* (2013.01)

(58) Field of Classification Search
CPC ........ B62D 5/0409; B62D 1/105; B62D 1/81; B62D 5/011; B62D 5/006; B62D 5/043; B62D 5/0454; B62D 5/0481
See application file for complete search history.

(56) References Cited

U.S. PATENT DOCUMENTS

| | | | |
|---|---|---|---|
| 6,896,089 B2* | 5/2005 | Mills ..................... | B62D 5/001 180/402 |
| 10,427,705 B2* | 10/2019 | Cao ......................... | B62D 1/10 |

(Continued)

FOREIGN PATENT DOCUMENTS

DE    10 2015 224 602 A1    6/2017

OTHER PUBLICATIONS nternational Search Report for IT Application No. 10201700121876, completed Jun. 13, 2018, 3 pages.
Written Opinion for It Application No. 10201700121876, 6 pages.

*Primary Examiner* — Kevin Hurley
*Assistant Examiner* — Harold Eric Pahlck, III
(74) *Attorney, Agent, or Firm* — Cantor Colburn LLP

(57) ABSTRACT

A steering system for a road vehicle; the steering system comprises: a steering wheel provided with an outer ring, which is mounted so as to rotate around a rotation axis and has no mechanical connection to steering wheels; a support element, which, on one side, can be rigidly fixed on the inside of the vehicle and, on the other side, is connected to the steering wheel so as to support the steering wheel; and a position sensor, which is designed to detect the angular position of the outer ring of the steering wheel around the rotation axis. The support element is telescopic so as to vary its axial size along the rotation axis in order to change the axial position of the steering wheel.

18 Claims, 14 Drawing Sheets

(56) References Cited

U.S. PATENT DOCUMENTS

| | | |
|---|---|---|
| 10,633,013 B2 * | 4/2020 | Kreutz .................. B62D 5/001 |
| 2003/0146038 A1 | 8/2003 | Mills et al. |
| 2020/0070871 A1 * | 3/2020 | Du ....................... B62D 5/0481 |
| 2020/0172145 A1 * | 6/2020 | Hirschfeld ............... B62D 1/18 |
| 2020/0262466 A1 * | 8/2020 | Specht .................. B62D 1/181 |
| 2020/0283053 A1 * | 9/2020 | Floerchinger ............ B62D 1/10 |

* cited by examiner

STEER BY WIRE ROAD VEHICLE STEERING SYSTEM PROVIDED WITH A TELESCOPIC SUPPORT ELEMENT FOR THE STEERING WHEEL

CROSS-REFERENCE TO RELATED APPLICATIONS

This patent application claims priority from Italian Patent Application No. 102017000121876 filed on Oct. 26, 2017, the disclosure of which is incorporated by reference.

TECHNICAL FIELD

The invention relates to a "steer by wire" road vehicle steering system.

PRIOR ART

In a road vehicle, a steering system is provided, which fulfils the function of controlling the steering angle, namely the angle existing between the direction of the front wheels (i.e. the plane of rotation of the front wheels and the longitudinal axis of the road vehicle. The steering system comprises a control shaft, which is arranged crosswise, is mechanically connected, at its opposite ends, to the hubs of the front wheels, and is mounted in an axially sliding manner in order to change the steering angle. Furthermore, the steering system comprises a steering wheel, which is mounted in a rotary manner inside the passenger compartment and is mechanically connected to the control shaft by means of a transmission device so that the rotation of the steering wheel determines an axial translation of the control shaft and, hence, a corresponding variation of the steering angle.

In the automotive industry there is a tendency towards an increasing use of "drive by wire" systems, in which the direct mechanical connection between the controls of the vehicle (steering wheel, accelerator, brake clutch, gear stick) and the actuators of the vehicle (steering tie rod, throttle valve, brake pump . . . ) is replaced by a (virtual) electronic connection, which involves the use of a position sensor, which reads the position of a control of the vehicle and communicates it to an electronic control unit, which controls an (electric or hydraulic) motor, which operates the corresponding actuator of the vehicle.

In modern vehicles, "drive by wire" systems are regularly used to control the accelerator as well as the gearbox controls and are currently spreading for the control of the brake and, in the near future, they should also be implemented in relation to the control of the steering wheel. Patent applications WO2017115411A1, US2017158222A1, US2016068182A1, WO2017097662A1 describe "steer by wire" road vehicle steering systems, i.e. systems with no mechanical connection between the steering control (i.e. the steering wheel) and the steering tie rod.

Patent application DE102015224602A1 describes a steering system of a road vehicle comprising a support element, which, on one side, can be rigidly fixed on the inside of the vehicle and, on the other side, is connected to a steering wheel so as to support the steering wheel; the support element is telescopic so as to vary its axial size along to rotation axis of the steering wheel in order to change the axial position of the steering wheel.

DESCRIPTION OF THE INVENTION

The object of the invention is to provide a "steer by wire" road vehicle steering system, which can be manufactured in a simple and economic fashion and, at the same time, is compact, effective and efficient.

According to the invention, there is provided a "steer by wire" road vehicle steering system according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
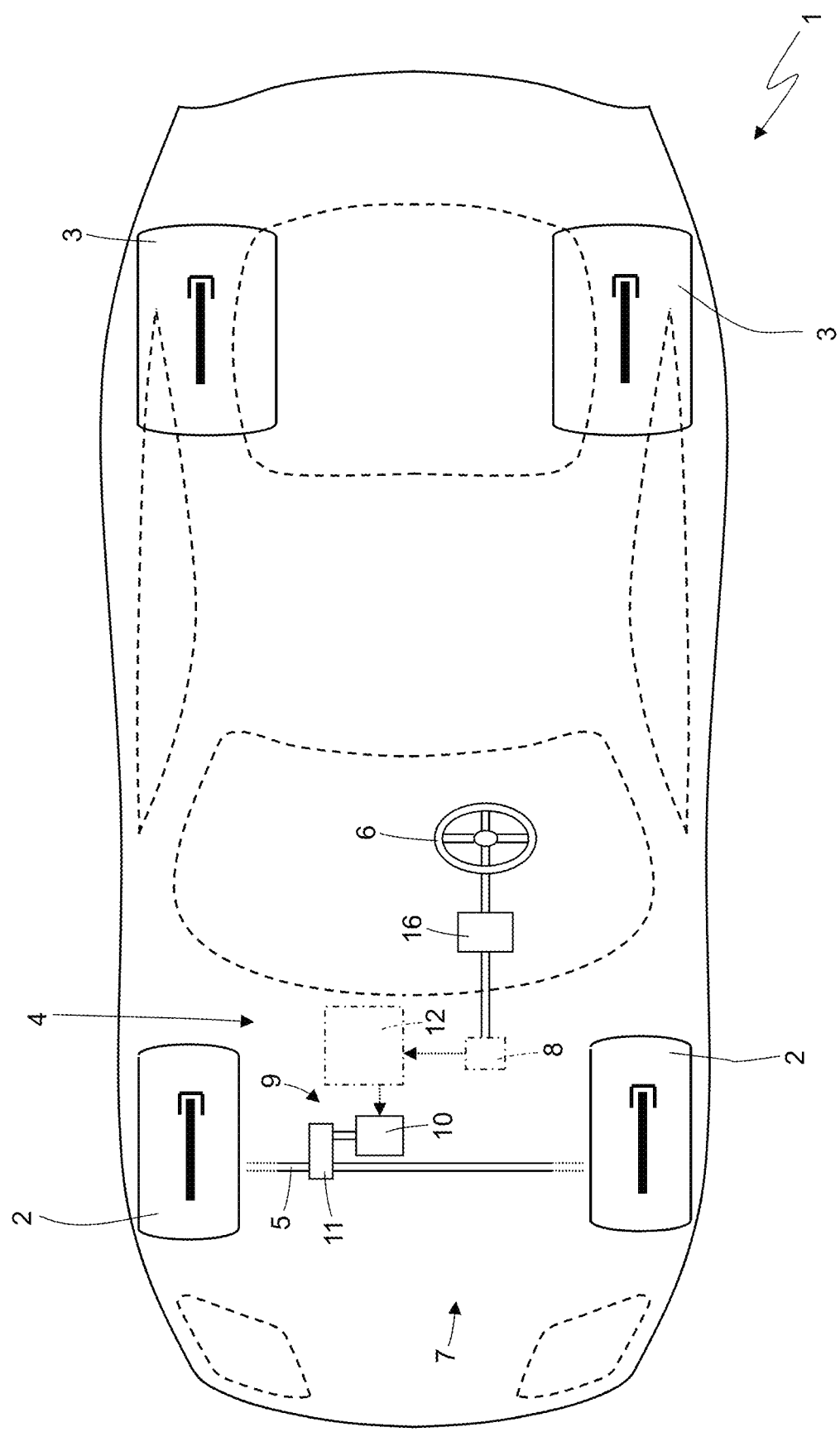
FIG. 1 is a schematic plan view of a road vehicle provided with a "steer by wire" steering system according to the invention.

In FIG. 1, number 1 indicates, as a whole, a road vehicle provided with two front steering wheels 2 and two rear drive wheels 3, which receive the torque from a powertrain system.

The road vehicle 1 comprises a steering system 4, which fulfils the function of controlling the steering angle, namely the angle existing between the direction of the front wheels 2 (i.e. the plane of rotation of the front wheels 2) and the longitudinal axis of the road vehicle 1.

The steering system 4 comprises a steering mechanism 5, which can be operated so as to change the steering angle, is arranged crosswise and consists of a central rod, which can axially slide and is mechanically connected to the fork ends of the front wheels 2 through articulated tie rods. Furthermore, the steering system 4 comprises a steering wheel 6, which is mounted in a rotary manner inside a passenger compartment and is electronically (virtually) connected to the steering mechanism 5 by means of an electronic transmission device 7 (without mechanical connection) so that the rotation of the steering wheel 6 determines an axial translation of the steering mechanism 5 and, hence, a corresponding variation of the steering angle. In other words, there is no mechanical connection between the steering mechanism 5 and the steering wheel 6 and the transmission device 7 only creates a functional (not mechanical) connection between the steering mechanism 5 and the steering wheel 6.

The transmission device 7 comprises a sensor 8, which detects in real time the angular position of the steering wheel 6 and the torque applied by the driver to the steering wheel 6; obviously, the sensor 8 is capable of determining the angular position of the steering wheel 6 in an extremely safe manner by carrying out different independent and redundant reading operations aimed at reading the angular position of the steering wheel 6. It should be pointed out that the sensor 8 can be directly coupled, in a mechanical manner, to the steering wheel 6 or to any other part that is angularly integral to the steering wheel 6.

Furthermore, the transmission device 7 comprises an actuator device 9, which operates the steering mechanism 5 so as to control the steering of the front steering wheels 2 of the road vehicle 1 and comprises an electric motor 10 and a transmission 11, which mechanically connects the electric motor 10 to the steering mechanism 5. As already mentioned above, the electric motor 10 (namely, the actuator device 9) is mechanically completely independent of and separate from the steering wheel 6 and is designed to control the steering of the front steering wheels 2 of the road vehicle 1 without any type of mechanical force/torque coming from the steering wheel 6.

Finally, the transmission device 7 comprises an electronic control unit ("ECU") 12, which is connected to the position sensor 8 so as to receive the reading of the angular position of the steering wheel 6 and is designed to control the electric motor 10 of the actuator device 9 so as to adjust the steering of the front steering wheels 2 of the road vehicle 1 based on the angular position of the steering wheel 6. The control unit 12 can physically consist of one single device or of different devices separated from one another and communicating with one another through the CAN network of the road vehicle 1.

Figure 2:
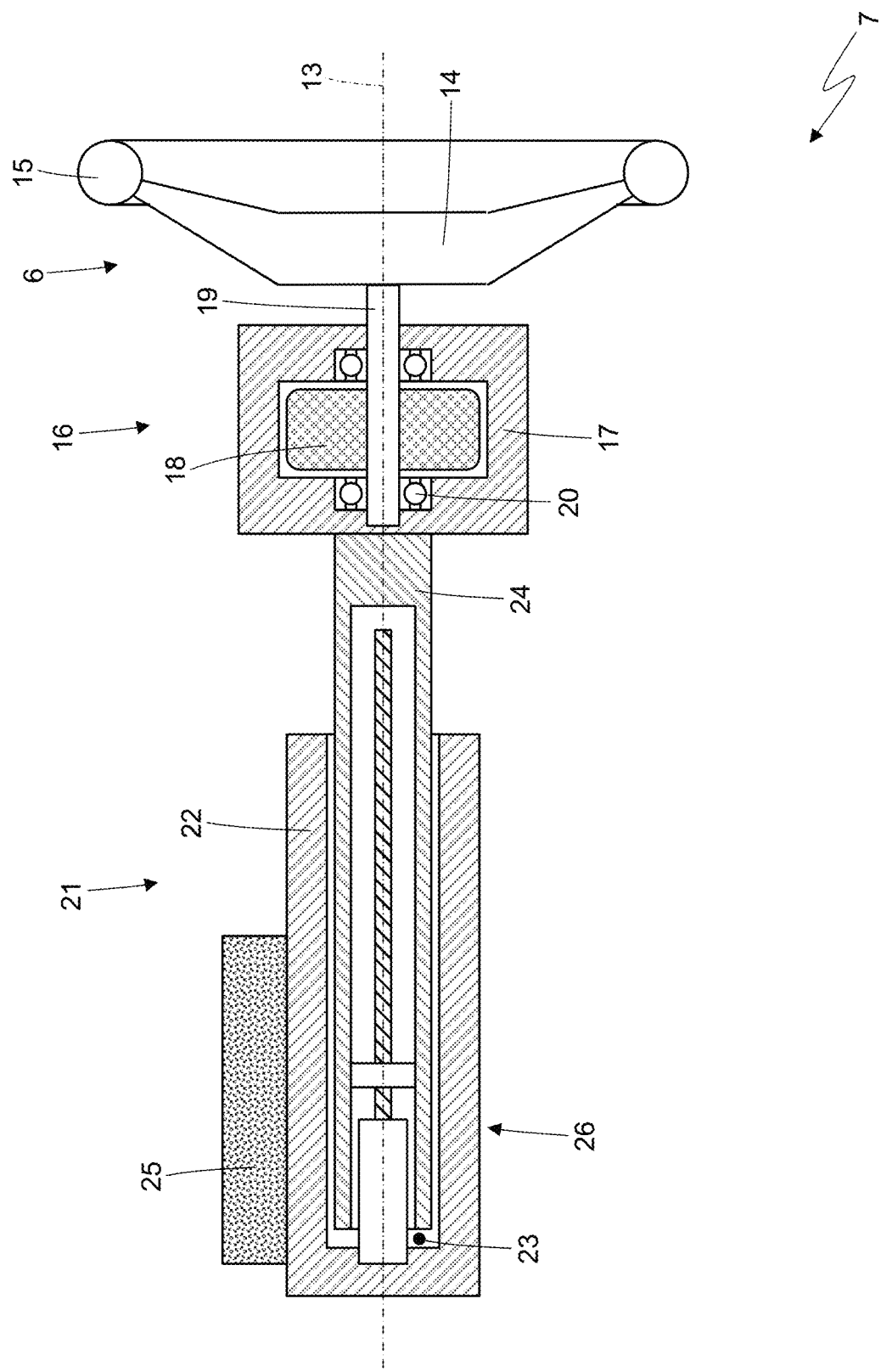
FIG. 2 is a schematic, partially sectional view of a transmission device of the steering system of FIG. 1.
Figure 5:
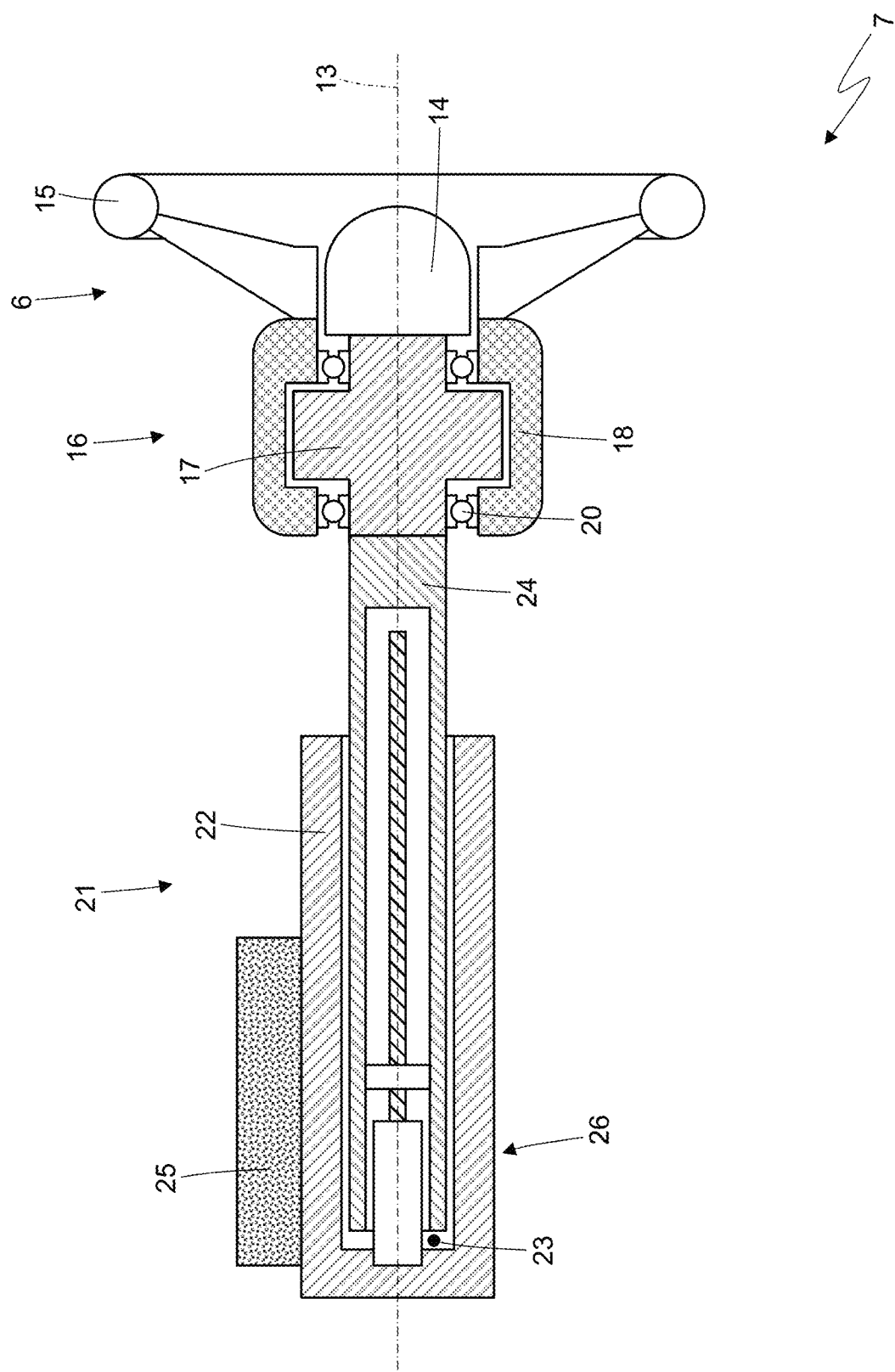

According to FIG. 2, the steering wheel 6 is mounted so as to rotate around a rotation axis 13. According to a possible embodiment (shown by way of example in FIGS. 2-4 and 8-10), the entire steering wheel 6 (i.e. both the central hub 14 and an outer ring 15) is mounted so as to rotate around the rotation axis 13; according to an alternative embodiment (shown by way of example in FIGS. 5-7), the central hub 14 of the steering wheel 6 is fixed (i.e. it does not rotate around the rotation axis 13), whereas the outer ring 15 of the steering wheel 6 is mounted so as to rotate around the rotation axis 13.

The transmission device 7 of the steering system 4 comprises an electric motor 16, which is directly connected to the steering wheel 6 so as to apply a variable feedback torque to the steering wheel 6 (to the outer ring 15 of the steering wheel 6); in other words, the function of the electric motor 16 is that of applying to the steering wheel 6 (to the outer ring 15 of the steering wheel 6) a variable torque that transmits to the driver torque sensations that are similar to the torque sensations of a traditional steering wheel mechanically connected to the steering wheels. In the absence of the electric motor 16, the steering wheel 6 (the outer ring 15 of the steering wheel 6) would rotate around the rotation axis 13 always with the same type of effort, thus preventing the driver from receiving any type of feedback from the steering wheel 6 (in other words, the steering wheel 6 would behave like the steering wheel of a video game instead of like the steering wheel of the an actual vehicle). The electric motor 16 comprises a stator 17, which does not rotate, and a rotor 18, which can rotate relative to the stator 17 around the rotation axis 13 (namely, is coaxial to the steering wheel 6) and is mechanically connected to the steering wheel 6 (to the outer ring 15 of the steering wheel 6) so as to apply a variable feedback torque to the steering wheel 6. Furthermore, the electric motor 16 supports the steering wheel 6, i.e. the steering wheel 6 is mounted on the electric motor 16; as a consequence, the steering wheel 6 (the outer ring 15 of the steering wheel 6) is rigidly integral to the rotor 18 of the electric motor 16 and is supported by the rotor 18 of the electric motor 16.

Figure 3:
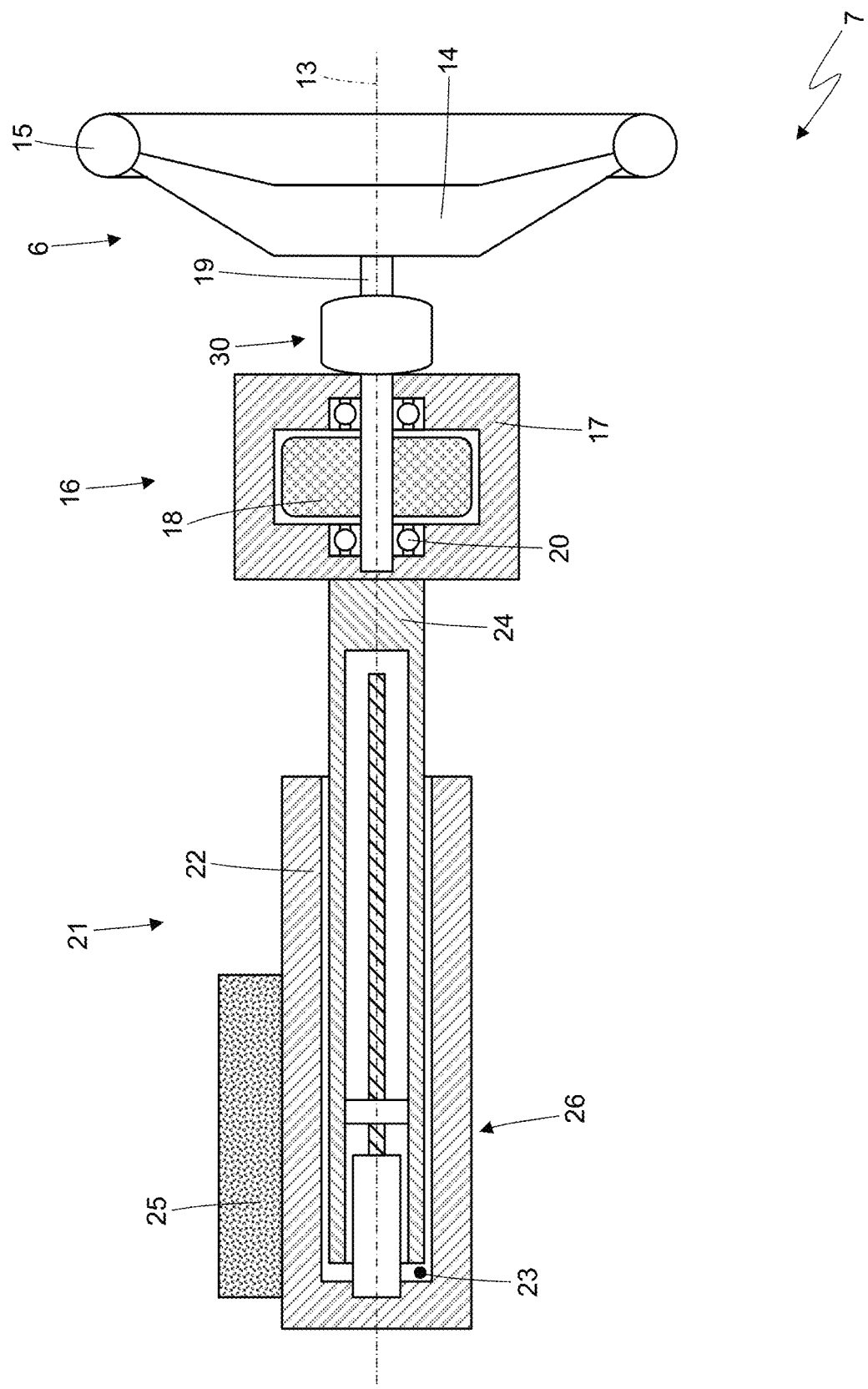
FIGS. 3-10 are schematic, partially sectional views of corresponding variants of the transmission device shown in FIG. 2.
Figure 4:
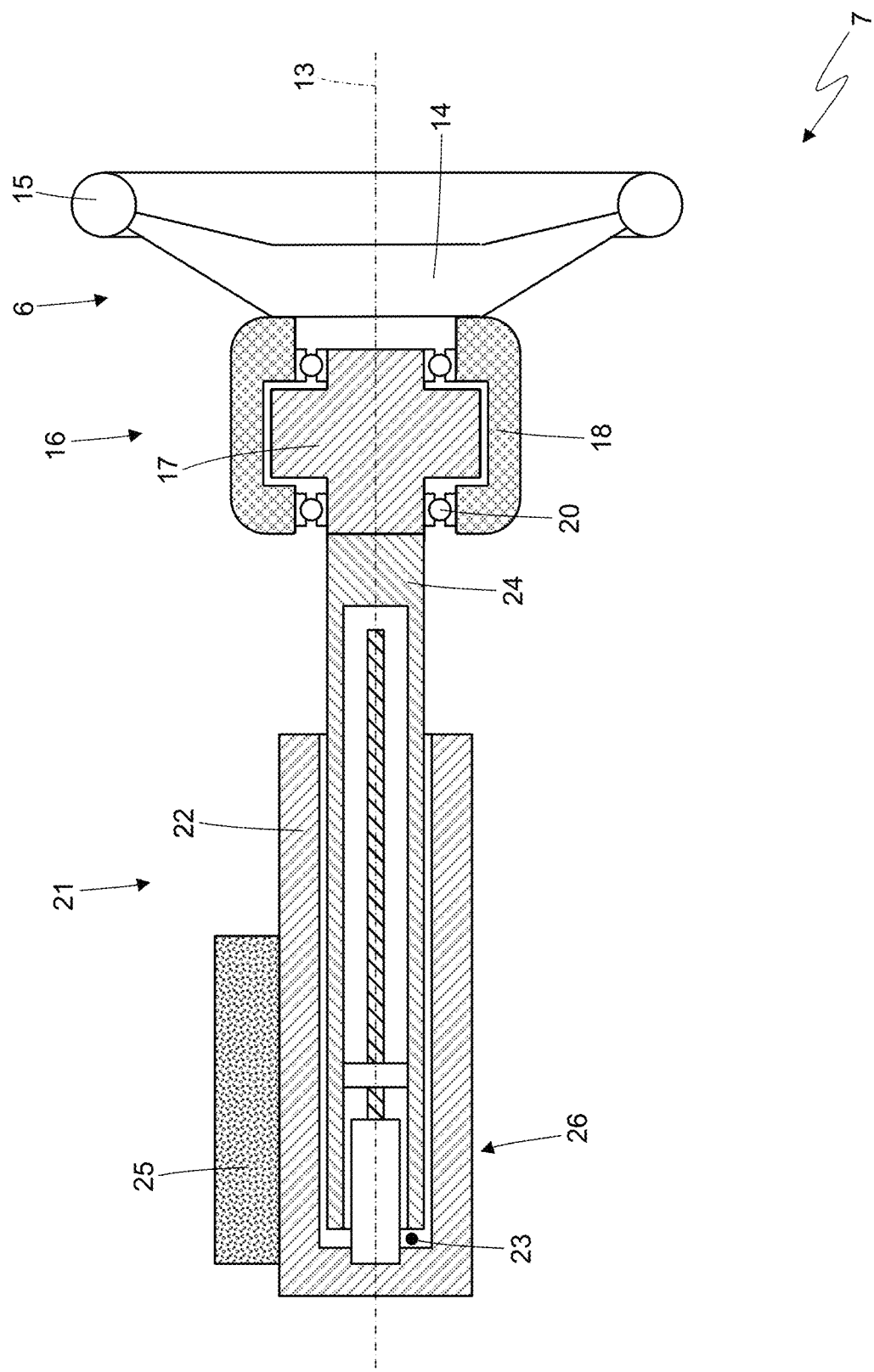

In the embodiment shown in FIGS. 2 and 3, in the electric motor 16, the rotor 18 is internal and, therefore, it is radially arranged on the inside of the stator 17. In this embodiment, the rotor 18 of the electric motor 16 comprises a shaft 19, which supports the steering wheel 6; in particular, the bearings 20, which support the rotor 18 and are interposed between the rotor 18 and the stator 17, are preferably coupled to the shaft 19 of the rotor 18.

In the alternative embodiment shown in FIGS. 4-8, in the electric motor 16, the rotor 18 is external and, therefore, it is radially arranged on the outside of the stator 17. In this embodiment, the rotor 18 of the electric motor 16 generally (though, not necessarily) is without shaft. This embodiment is particularly advantageous when the central hub 14 of the steering wheel 6 is fixed (i.e. does not rotate around the rotation axis 13) and the sole outer ring 15 of the steering wheel 6 can rotate around the rotation axis 13; indeed, in this embodiment, the central hub 14 of the steering wheel 6 can be directly connected to the stator 17 of the electric motor 16 (i.e. the central hub 14 of the steering wheel 6 can be rigidly constrained to the stator 17 of the electric motor 16), whereas the outer ring 15 of the steering wheel 6 can be directly connected to the rotor 18 of the electric motor 16 (i.e. the outer ring 15 of the steering wheel 6 can be rigidly constrained to the rotor 18 of the electric motor 16).

In all the embodiments shown in the accompanying figures, the transmission device 7 of the steering system 4 comprises a support element 21, which, on one side can be rigidly fixed on the inside of the road vehicle 1 (in particular, to the dashboard of the road vehicle 1) and, on the other side, is rigidly connected to the stator 17 of the electric motor 16 so as to support the electric motor 16. In other words, the support element 21 is the mounting means through which the electric motor 16 (and, hence, the steering wheel 6 supported by the electric motor 16) is installed and fixed on board the road vehicle 1.

According to a preferred embodiment, the support element 21 is telescopic so as to vary its axial size along the rotation axis 13 in order to change the axial position of the electric motor 16 and, hence, of the steering wheel 6. In particular, the support element 21 comprises an outer tubular body 22, which can be rigidly fixed on the inside of the vehicle 1 and is internally hollow, namely has, on the inside, a chamber 23, which is open on one side (facing the electric motor 16); furthermore, the support element 21 comprises an inner body 24, which is rigidly connected to the stator 17 of the electric motor 16 (i.e. supports the stator 17 of the electric motor 16), is partially arranged inside the outer body 22 (i.e. in the chamber 23 of the outer body 22), and can axially slide relative to the outer body 22. It should be pointed out that the inner body 24 can only slide axially relative to the outer body 22 and, therefore, cannot make any rotation relative to the outer body 22.

In the embodiment shown in the accompanying figures, the outer body 22 is provided with a bracket 25, which is used to fix the outer body 22 (hence, the support element 21) to the dashboard of the road vehicle 1.

The support element 21 comprises an actuator device 26, which is arranged on the inside of the outer body 22 (i.e. is housed in the chamber 23 of the outer body 22) and is designed to axially translate the inner body 24 relative to the outer body 22. The actuator device 26 always has the function of stopping (forbidding) the axial translation between the two bodies 22 and 24, so as to make sure that, in use, the steering wheel 6 remains still in a predefined axial position; furthermore, the actuator device 26 can be active, i.e. have an (electric) motor, which causes an axial translation movement of the inner body 24 relative to the outer body 22, or it can be passive, i.e. need the manual intervention of the driver in order to cause an axial translation movement of the inner body 24 relative to the outer body 22. In the non-limiting embodiments shown in the accompanying figures, the actuator device 26 is active and comprises an electric motor, which is integral to the outer body 22 and causes the rotation of a worm screw, on which an abutment is screwed, which is integral to the inner body 24.

Figure 7:
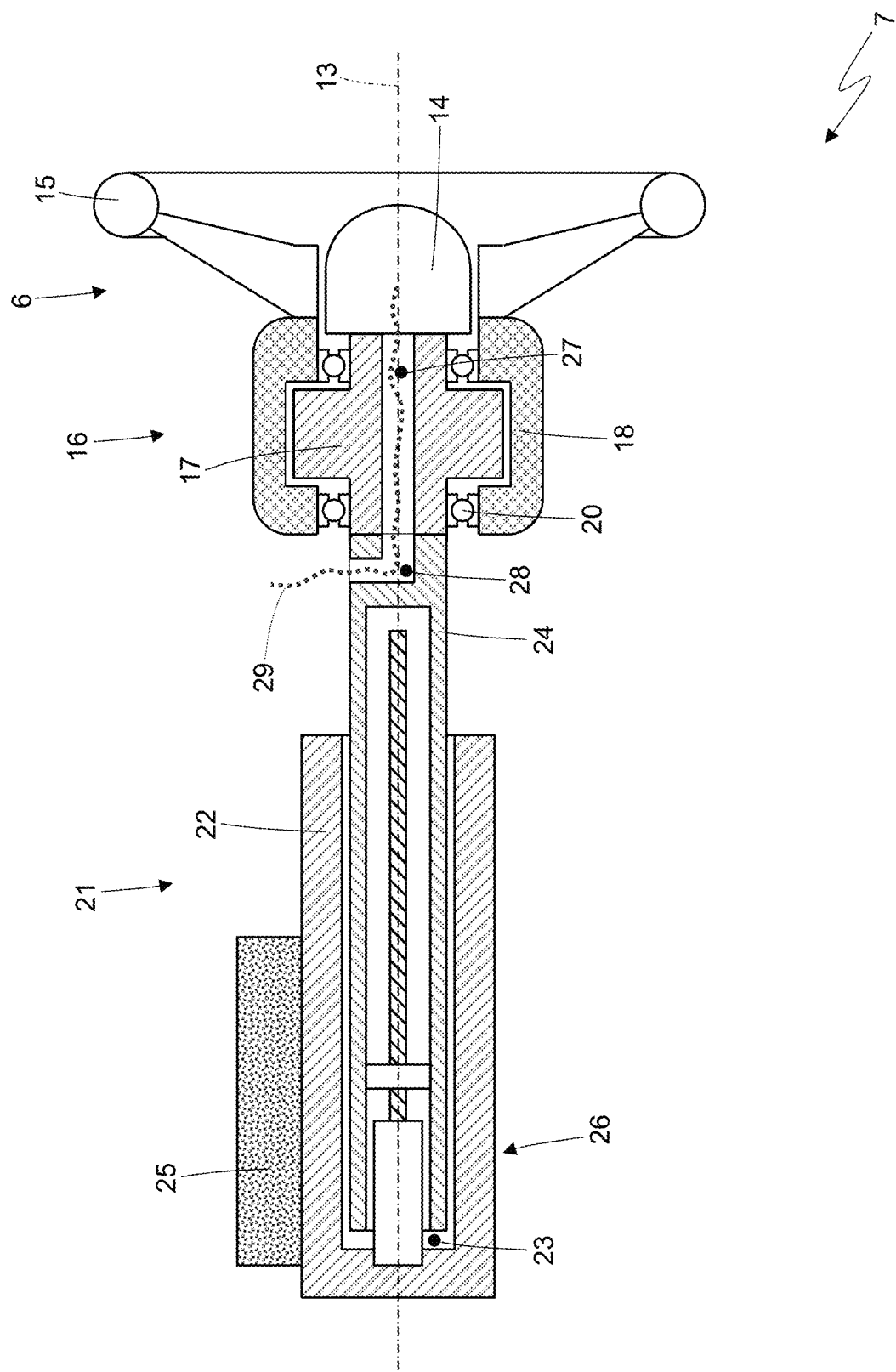
Figure 8:
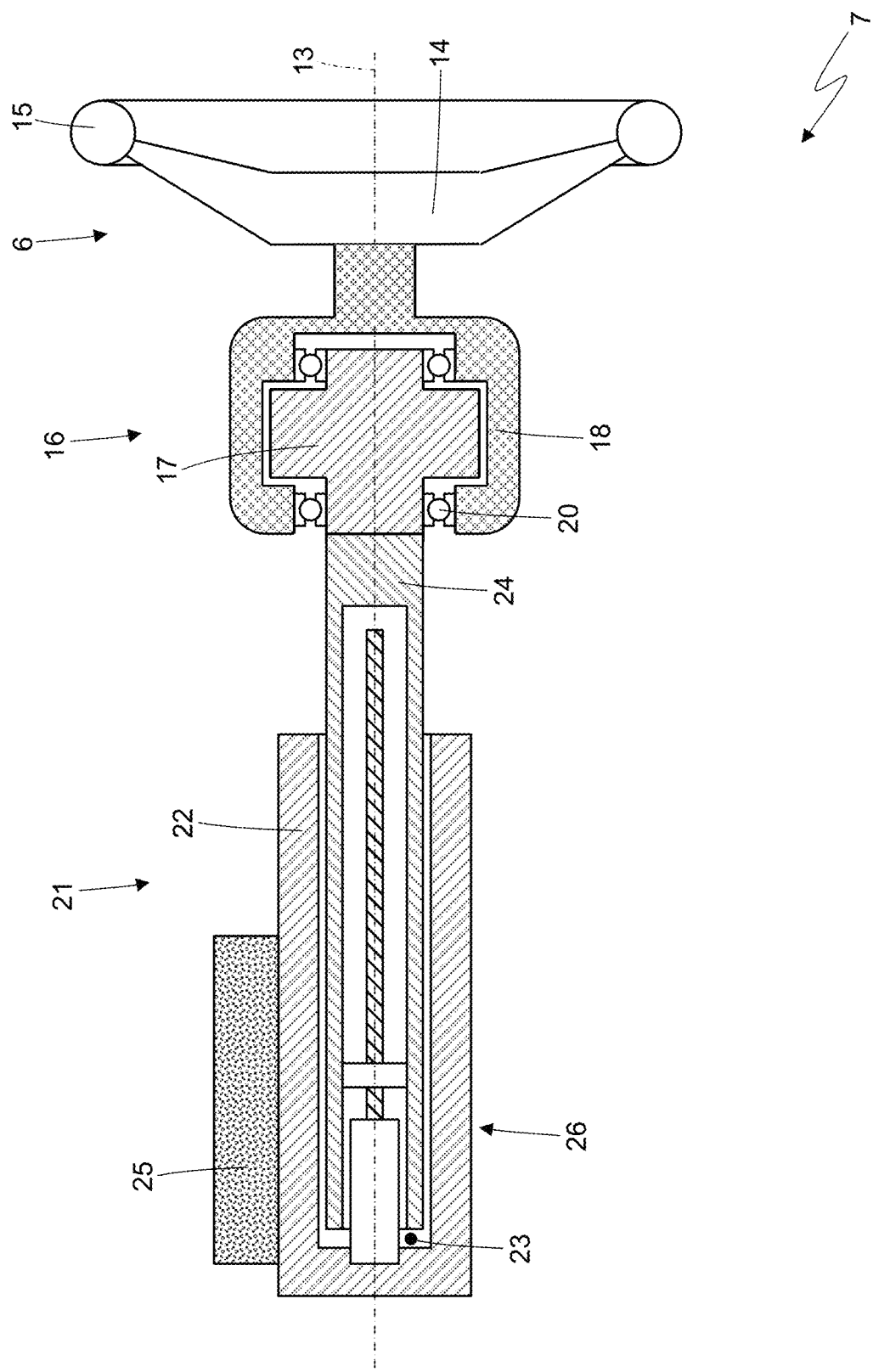

According to FIG. 7, the stator 17 of the electric motor 16 has, at the centre, a cable-leading through duct 27, which is coaxial to the rotation axis 13; similarly, the inner body 24 of the support element 21 also has a cable-leading through duct 28, which is elbow-shaped (i.e. "L"-shaped) and has an opening, which is obtained through a base wall of the inner body 24, faces and is coaxial to the cable-leading duct 27, and another opposite opening, which is obtained through a side wall of the inner body 24. A cabling 29 (i.e. a set of electrical cables grouped together to form one single bundle) is provided, which originates from the central hub 14 of the steering wheel 6 and is arranged through the cable-leading ducts 27 and 28 so as to electrically connect the steering wheel 6 to the rest of the road vehicle 1. In this embodiment, it is possible to establish an electrical connection between the steering wheel 6 and the rest of the road vehicle 1 without using rotary (i.e. sliding) electrical contacts or spiral cabling (which enables a certain degree of twisting). The presence of the cable-leading duct 27 inside the stator 17 of the electric motor 16 is particularly advantageous when, in the electric motor 16, the rotor 18 is external (according to FIG. 7), but it is also possible when, in the electric motor 16, the rotor 18 is internal.

Figure 9:
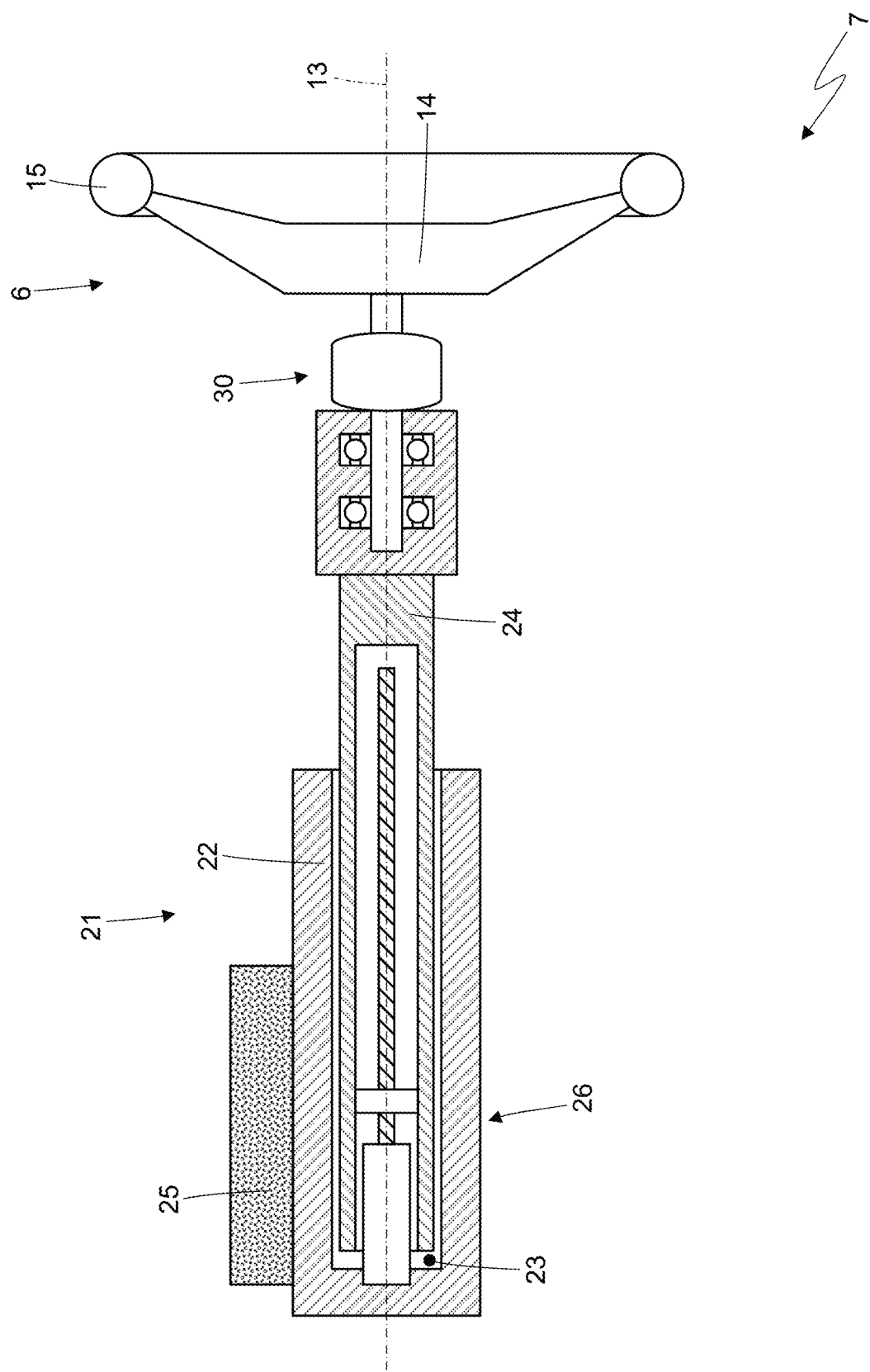

In the embodiments shown in FIGS. 2-8 and 10, the transmission device 7 of the steering system 4 comprises the electric motor 16, which applies the feedback torque to the steering wheel 6; in the alternative embodiment shown in FIG. 9, the transmission device 7 of the steering system 4 has no electric motor 16 and, therefore, the steering wheel 6 is directly connected to the inner body 24 of the support element 21; in particular, there is a shaft that, on one side, is rigidly connected to the steering wheel 6 and, on the opposite side, is connected to the inner body 24 of the support element 21 through bearings.

Figure 10:
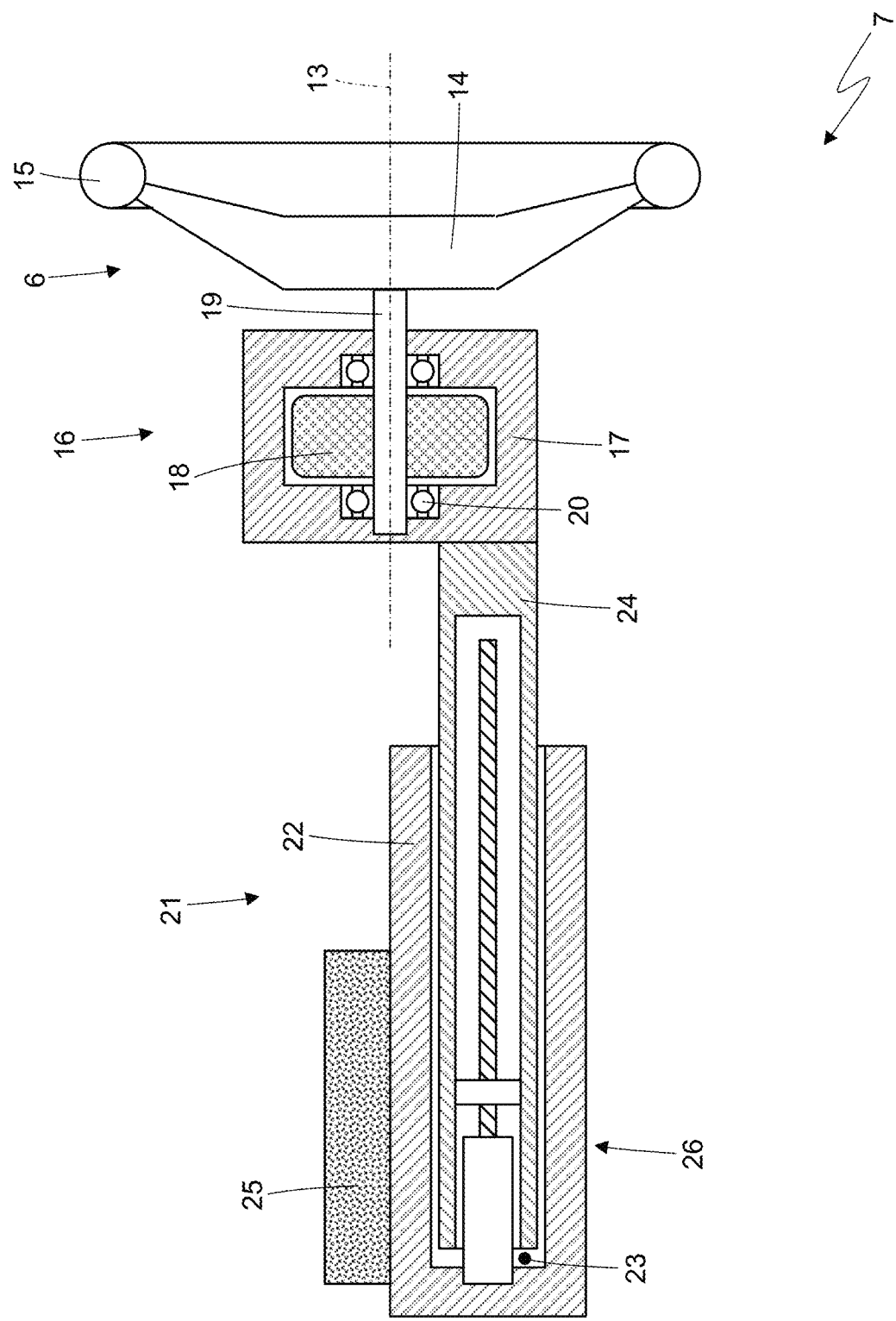

In the embodiments shown in FIGS. 2-9, the support element 21 is coaxial to the electric motor 16 and to the steering wheel 6; in the alternative embodiment shown in FIG. 10, the support element 21 is not aligned with the electric motor 16 and with the steering wheel 6 and is mounted lower than the electric motor 16 and the steering wheel 6; the lack of alignment between the support element 21 and the electric motor 16 as well as the steering wheel 6 increases the space available in the part of dashboard above the support element 21 (since the bracket 25 can be placed lower), thus creating a larger space for information devices (control panel, screens) or other devices to be installed in the upper part of the dashboard in front of the driver.

Figure 6:
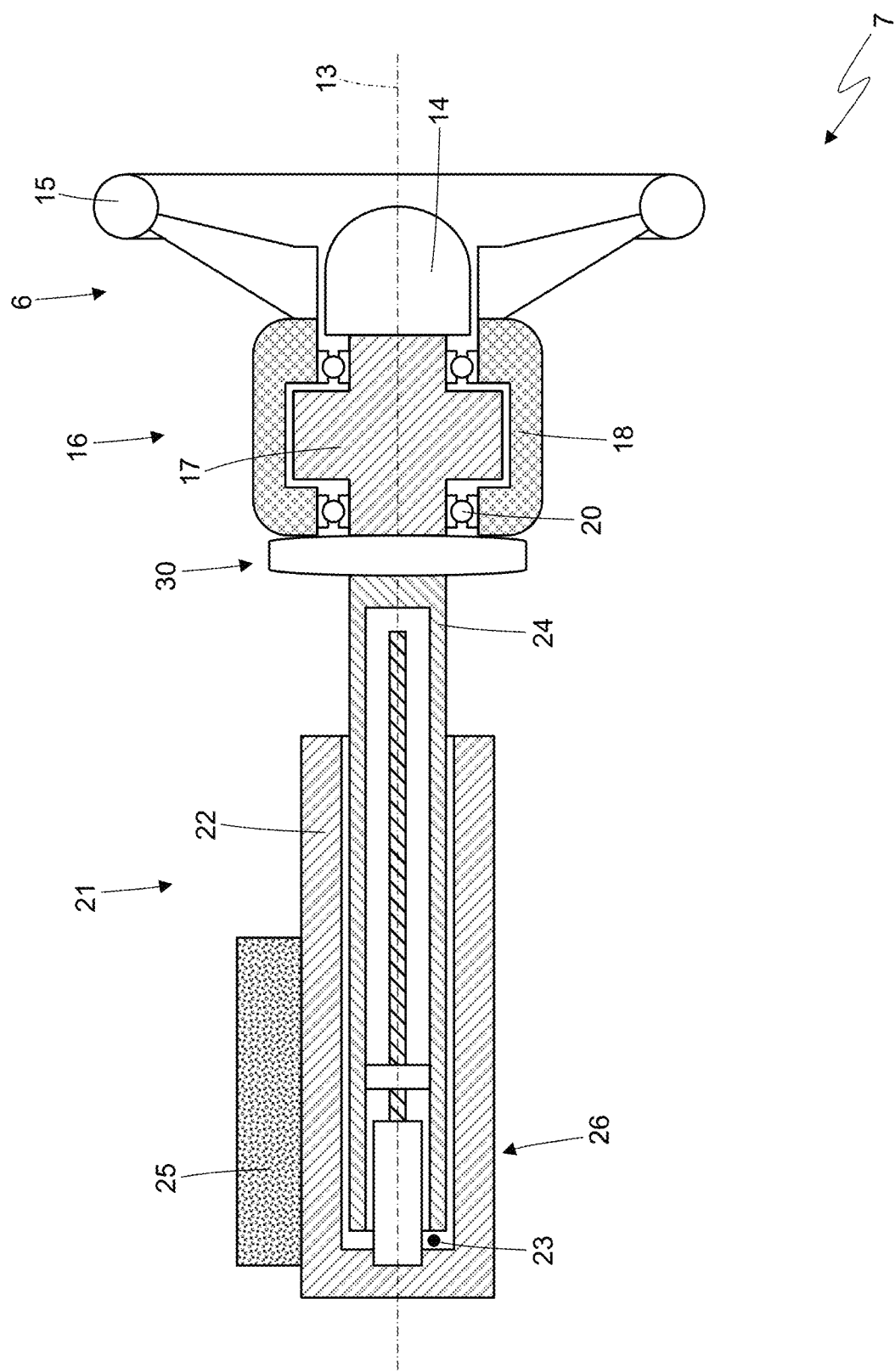

In the embodiments shown in FIGS. 3, 6 and 9, the transmission device 7 of the steering system 4 comprises a mechanical limit stop device 30, which is coupled to the steering wheel 6 and limits, in both directions, the maximum angular width of the rotation of the steering wheel 6 around the rotation axis 13, so that the steering wheel 6 can make, on the whole, a rotation around the rotation axis 13 that is greater than 360°. It should be pointed out that the fact that the steering wheel 6 is allowed to rotate, on the whole, over more than 360° ensures (when desired) a high steering "reduction", namely in order to avoid (when desired) a too direct steering (which is ideal when driving on a race track, but is not suitable for everyday driving in traffic). In the absence of the mechanical limit stop device 30, it would be necessary to create "virtual" limit stops using the electric motor 16 to generate a very high braking torque, which simulates the presence of a mechanical limits stop; however, this solution, despite being very elegant, requires an oversized electric motor 16 (in order to allow the electric motor 16 to generate a braking torque that is high enough to stop the rotation of the steering wheel 6) and, hence, leads to an increase in size, mass and costs.

According to FIGS. 11-14, the limit stop device 30 comprises a groove 31, which is wound in a spiral around the rotation axis 13 over more than 360° and has, at the two opposite ends, two abutments 32, which define respective stop strikers; in other words, the groove 31 extends in a spiral around the rotation axis 13 over more than 360° from an abutment 32 to the opposite abutment 32. By way of example, the groove 31 could extend around the rotation axis 13 over approximately 720° (i.e. two complete rotations of the steering wheel 6) or over approximately 1080° (i.e. three complete rotations of the steering wheel 6). Furthermore, the limit stop device 30 comprises a pin 33, which is arranged inside the groove 31 so as to engage and follow the groove 31 from an abutment 32 up to the opposite abutment 32; in other words, the pin 33 is inside the groove 31 and is forced to remain inside the groove 31, thus covering the entire extension of the groove 31 from an abutment 32 to the opposite abutment 32.

Furthermore, one between the groove 31 and the pin 33 is angularly integral to the steering wheel 6 (hence, rotates in an angularly integral manner with the steering wheel 6), whereas the other one between the groove 31 and the pin 33 is angularly integral to a part that does not rotate together with the steering wheel 6 (in particular, is angularly integral to the inner body 24 of the support element 21). In other words, according to a possible embodiment, the groove 31 is angularly integral to the steering wheel 6, whereas the pin 33 is angularly integral to a part that does not rotate with the steering wheel 6 (i.e. is angularly integral to the inner body 24 of the support element 21); alternatively, the pin 33 is angularly integral to the steering wheel 6, whereas the groove 31 is angularly integral to a part that does not rotate with the steering wheel 6 (i.e. is angularly integral to the inner body 24 of the support element 21).

Finally, one between the groove 31 and the pin 33 can axially slide relative to the steering wheel 6. In other words, the groove 31 can axially slide relative to the steering wheel 6 or the pin 33 can axially slide relative to the steering wheel 6.

Figure 11:
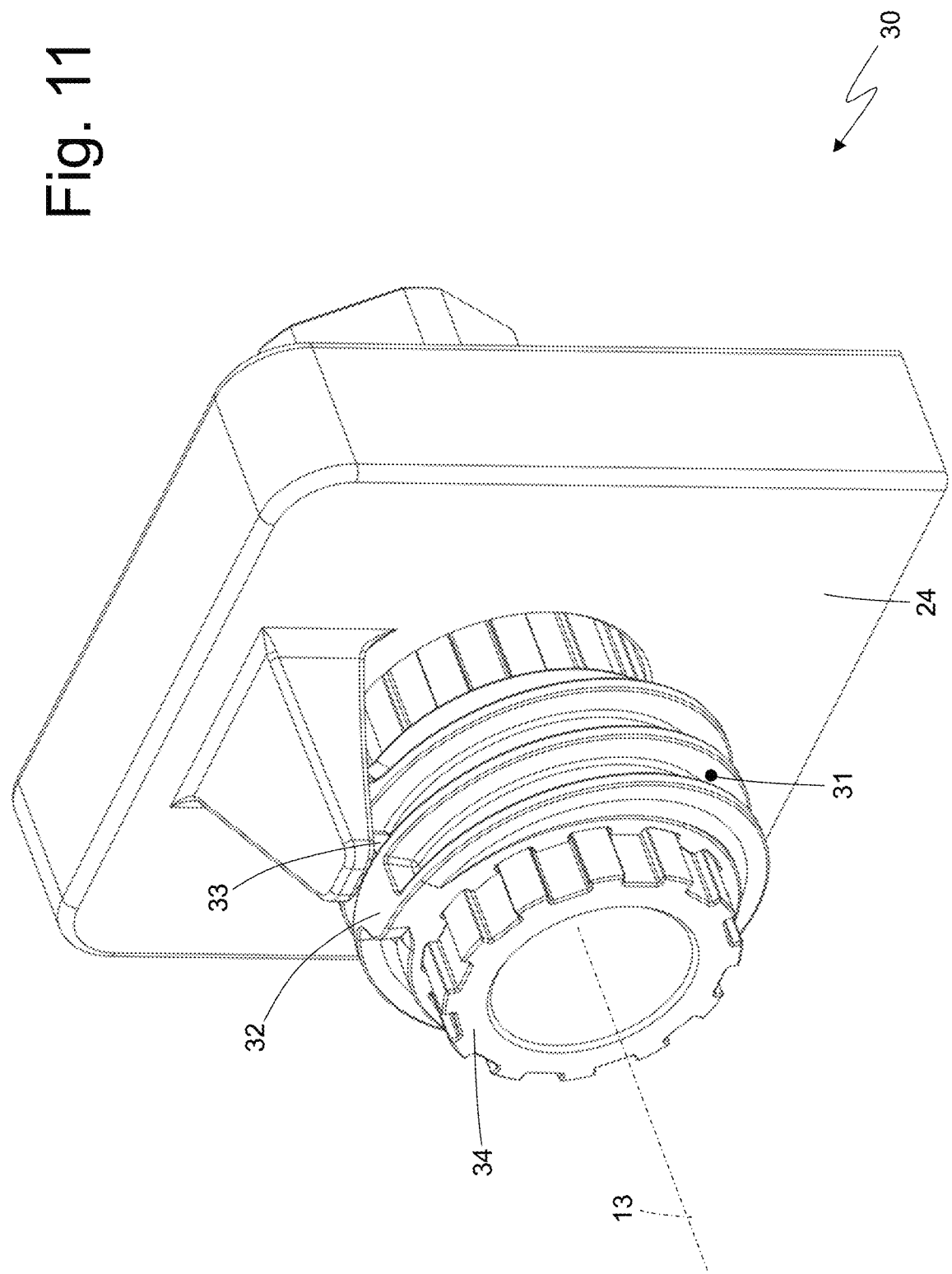
FIG. 11 is a perspective view of a mechanical limit stop device of the transmission device shown in FIGS. 3, 6 and 9.
Figure 12:
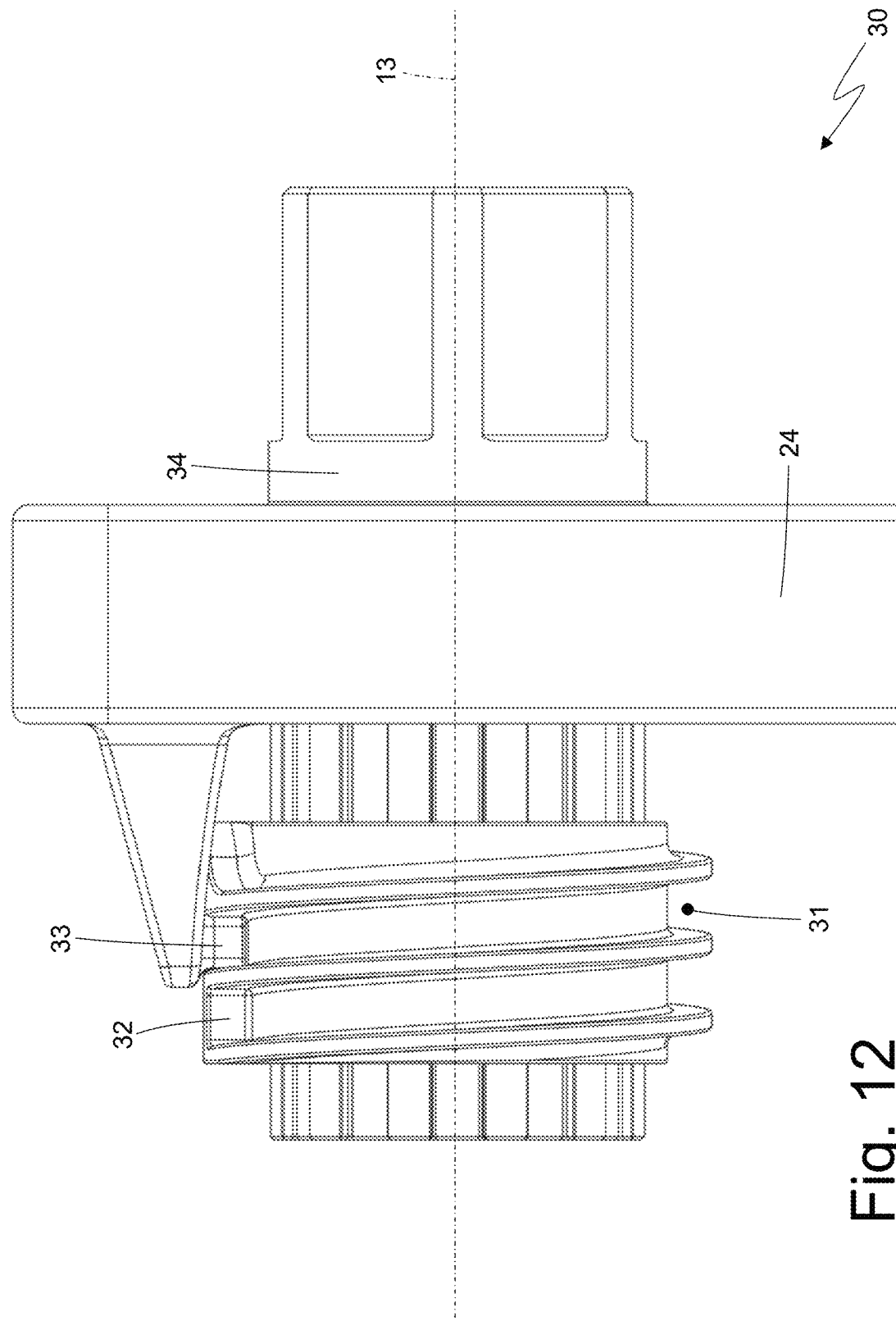
FIG. 12 is a side view of the limit stop mechanism of FIG. 11.
Figure 13:
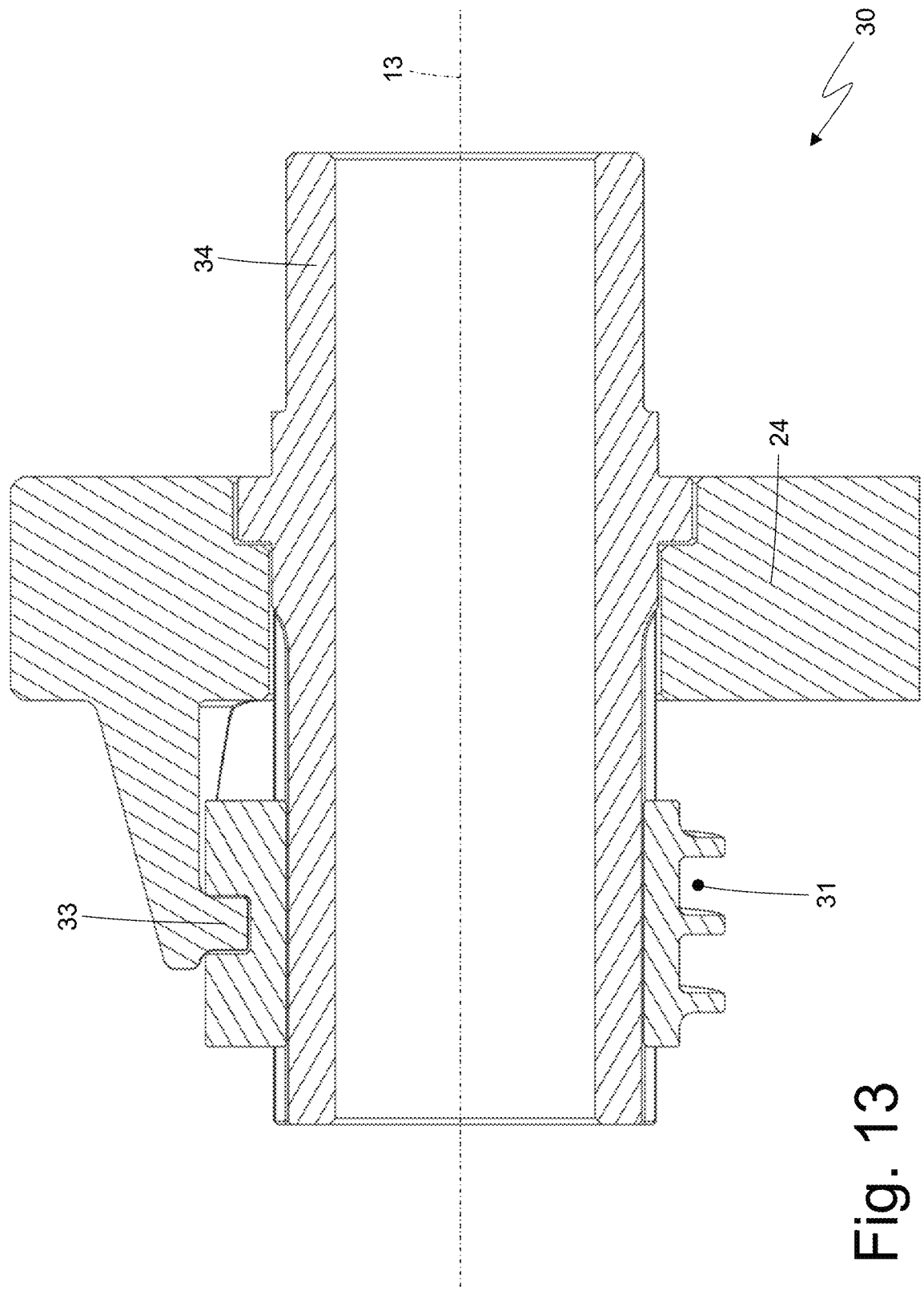
FIG. 13 is a side view, with a longitudinal section, of the limit stop mechanism of FIG. 11.

In the embodiment shown in FIGS. 11, 12 and 13, the groove 31 is angularly integral to the steering wheel 6 (in particular, to a shaft 34 coaxial to the rotation axis 13 which rigidly supports at least the outer ring 15 of the steering wheel 6) and can also axially slide relative to the steering wheel 6 (in particular, relative to the shaft 34); as a consequence, the pin 33 is rigidly connected to a part that does not rotate with the steering wheel 6 (i.e. is angularly integral to the inner body 24 of the support element 21). In this embodiment, the groove 31 is coupled to the steering wheel 6 (in particular, to the shaft 34) through a splined coupling, which constrains in an angular manner, enabling, at the same time, an axial sliding. It should be pointed out that the groove 31 can be mounted on any part that is angularly integral to the steering wheel 6 (i.e. that rotates around the rotation axis 13 together with the steering wheel 6), for example the shaft 34 coaxial to the rotation axis 13 which rigidly supports at least the outer ring 15 of the steering wheel 6, the rotor 18 of the electric motor 16 or the steering wheel 6 itself.

Figure 14:
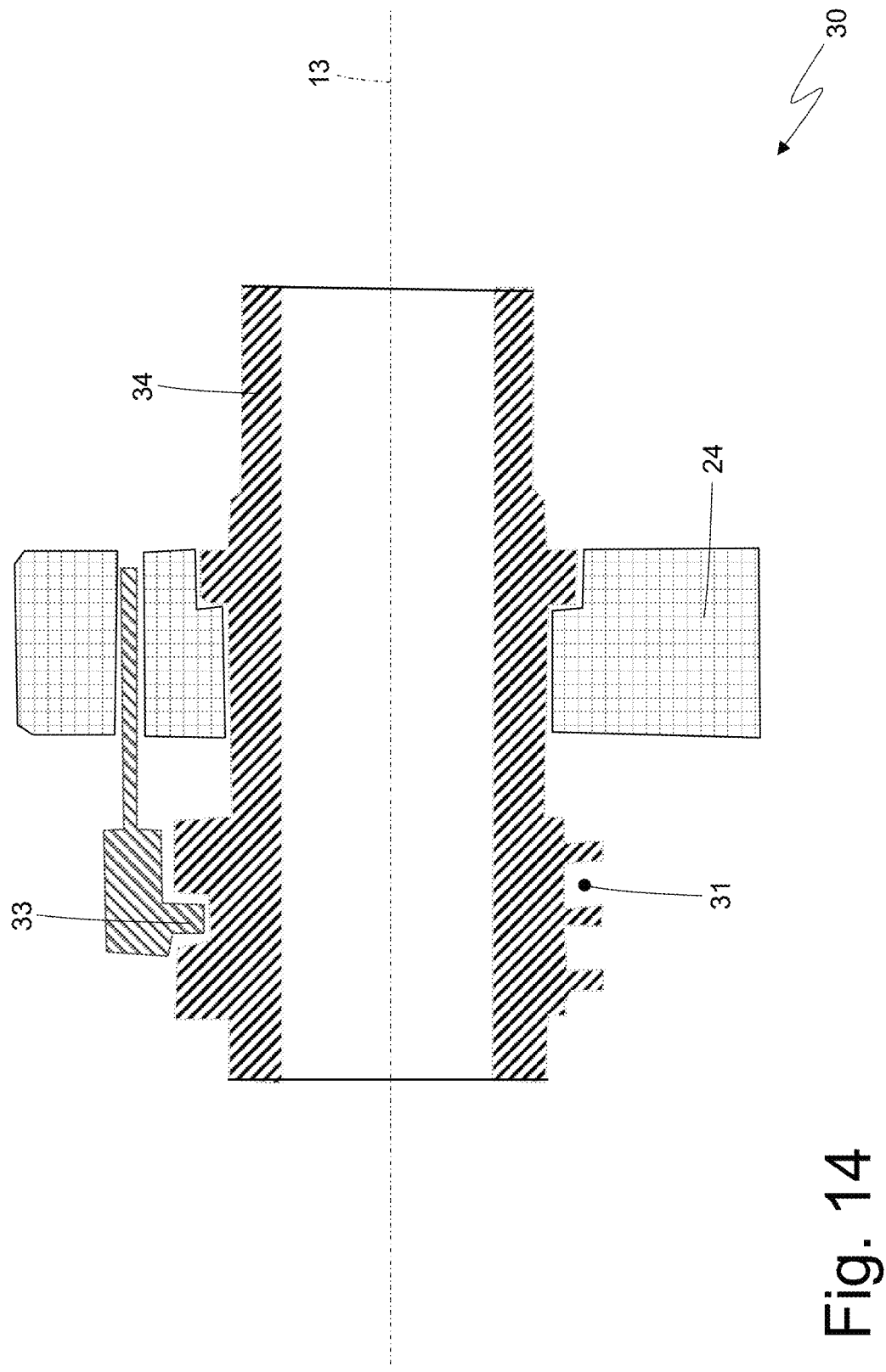
FIG. 14 is a side view, with a longitudinal section, of a variant of the limit stop mechanism of FIG. 11.

In the embodiment shown in FIG. 14, the groove 31 is angularly integral to the steering wheel 6 (in particular, to a shaft 34 coaxial to the rotation axis 13 which rigidly supports at least the outer ring 15 of the steering wheel 6) and is also rigidly constrained to the steering wheel 6 (in particular, to the shaft 34); as a consequence, the pin 33 is angularly integral and can axially slide relative to a part that does not rotate with the steering wheel 6 (i.e. is angularly integral and can axially slide relative to the inner body 24 of the support element 21). In other words, the pin 33 can axially slide, but cannot rotate relative to a part that does not rotate together with the steering wheel 6 (i.e. relative to the inner body 24 of the support element 21).

The embodiments described herein can be combined with one another, without for this reason going beyond the scope of protection of the invention.

The steering system 4 described above has numerous advantages.

First of all, the steering system 4 described above is particularly compact, effective and efficient, since the total number of components of the transmission device 7 is reduced to a minimum. In particular, the steering wheel 6 is directly supported by the electric motor 16, which, hence, applies the feedback torque to the steering wheel 6 without intermediate elements. Furthermore, the support element 21 is extremely simple, functional and compact, as it has a tubular shape housing, on the inside, the actuator device 26, which regulates the axial movements of the steering wheel 6.

Moreover, the support element 21 allows the steering wheel 6 to cover a much wider axial stroke, which can get up to 250 mm, without particular constructive complications (also thanks to the absence of a connection shaft towards the steering mechanism 5).

LIST OF THE REFERENCE NUMBERS OF THE FIGURES

1 road vehicle
2 front wheels
3 rear wheels
4 steering system
5 steering mechanism
6 steering wheel
7 transmission device
8 sensor
9 actuator device
10 electric motor
11 transmission
12 control unit
13 rotation axis
14 central hub
15 outer ring
16 electric motor
17 stator
18 rotor
19 shaft
20 bearings
21 support element
22 outer body
23 chamber
24 inner body
25 bracket
26 actuator device
27 cable-leading duct
28 cable-leading duct
29 cabling
30 limit stop device
31 groove
32 abutment
33 pin
34 shaft

The invention claimed is:

1. A steering system (4) for a road vehicle (1); the steering system (4) comprises:
    a steering wheel (6) provided with an outer ring (15), which is mounted so as to rotate around a rotation axis (13) and has no connection to steering wheels (2);
    a support element (21), which, on one side, can be rigidly fixed on the inside of the vehicle (1) and, on the other side, is connected to the steering wheel (6) so as to support the steering wheel (6); and
    a position sensor (8), which is designed to detect the angular position of the outer ring (15) of the steering wheel (6) around the rotation axis (13);
    wherein the support element (21) is telescopic so as to vary its axial size along the rotation axis (13) in order to change the axial position of the steering wheel (6);
    wherein the support element (21) comprises: an outer body (22), which can be rigidly fixed on the inside of the vehicle (1) and is internally hollow; an inner body (24), which is connected to the steering wheel (6), is partially arranged on the inside of the outer body (22), and can axially slide relative to the outer body (22); and an actuator device (26), which is designed to axially translate the inner body (24) relative to the outer body (22); and
    wherein the actuator device (26) is completely arranged on the inside of the outer body (22).

2. The steering system (4) according to claim 1, wherein the outer body (22) is tubular and has, on the inside, a chamber (23), which is open on one side, partially houses the inner body (24) in an axially sliding manner, and houses the actuator device (26).

3. The steering system (4) according to claim 1, wherein the actuator device (26) is designed to stop the axial translation between the outer body (22) and the inner body (24) so as to make sure that, in use, the steering wheel (6) remains still in a predefined axial position.

4. The steering system (4) according to claim 1, wherein the actuator device (26) is active and comprises a first electric motor, which causes an axial translation movement of the inner body (24) relative to the outer body (22).

5. The steering system (4) according to claim 4, wherein the actuator device (26) comprises:
    the first electric motor, which is integral to the outer body (22);
    a worm screw, which is caused to rotate by the first electric motor; and
    an abutment, which is screwed in the worm screw and is integral to the inner body (24).

6. The steering system (4) according to claim 1, wherein the support element (21) is not aligned with the steering wheel (6) and is arranged lower than the steering wheel (6).

7. The steering system (4) according to claim 1 and comprising a second electric motor (16), which applies a variable feedback torque to the outer ring (15) of the steering wheel (6), is interposed between the support element (21) and the steering wheel (6) so as to support the steering wheel (6), and comprises a stator (17), which is rigidly connected to the support element (21), and a rotor (18), which is rigidly connected at least to the outer ring (15) of the steering wheel (6).

8. The steering system (4) according to claim 1 and comprising a third electric motor (10), which is mechanically completely independent of and separate from the steering wheel (6) and is designed to control the steering of the steering wheels (2) of the vehicle (1).

9. The steering system (4) according to claim 8 and comprising a control unit (12), which is connected to the position sensor (8) so as to receive the reading of the angular position of the steering wheel (6) and is designed to control the third electric motor (10) so as to adjust the steering of the steering wheels (2) of the vehicle (1) based on the angular position of the steering wheel (6).

10. The steering system (4) according to claim 1 and comprising a mechanical limit stop device (30), which is coupled to the outer ring (15) of the steering wheel (6) and limits, in both directions, the maximum angular width of the rotation of the steering wheel (6) around the rotation axis (13), so that the steering wheel (6) can make, on the whole, a rotation around the rotation axis (13) that is greater than 360.degree.

11. The steering system (4) according to claim 10, wherein:
    the limit stop device (30) comprises a groove (31), which is wound in a spiral shape around the rotation axis (13) over more than 360.degree. and has, at the two opposite ends, two abutments (32), which define respective stop strikers;
    the limit stop device (30) comprises a pin (33), which is arranged on the inside of the groove (31) so as to engage and follow the groove (31) from an abutment (32) to the opposite abutment (32);
    one between the groove (31) and the pin (33) is angularly integral to the outer ring (15) of the steering wheel (6), whereas the other one between the groove (31) and the pin (33) is angularly integral to a part that does not rotate together with the outer ring (15) of the steering wheel (6); and
    one between the groove (31) and the pin (33) can axially slide relative to the outer ring (15) of the steering wheel (6).

12. The steering system (4) according to claim 11, wherein:
    the groove (31) is angularly integral to the outer ring (15) of the steering wheel (6) and can axially slide relative to the outer ring (15) of the steering wheel (6); and
    the pin (33) is rigidly connected to a part that does not rotate together with the steering wheel (6).

13. The steering system (4) according to claim 12, wherein the groove (31) is coupled to the steering wheel (6) through a splined coupling.

14. The steering system (4) according to claim 7, wherein:
    the electric motor (16) comprises a stator (17), which does not rotate, and a rotor (18), which can rotate relative to the stator (17) around the rotation axis (13);
    in the electric motor (16), the rotor (18) is internal and, therefore, it is radially arranged on the inside of the stator (17);
    the rotor (18) of the electric motor (16) comprises a shaft (19), which supports the steering wheel (6) and is supported by bearings (20) interposed between the rotor (18) and the stator (17); and
    the bearings (20) supporting the rotor (18) are coupled to the shaft (19) of the rotor (18).

15. The steering system (4) according to claim 7, wherein:
    the electric motor (16) comprises a stator (17), which does not rotate, and a rotor (18), which can rotate relative to the stator (17) around the rotation axis (13); and
    in the electric motor (16), the rotor (18) is external and, therefore, it is radially arranged on the outside of the stator (17).

16. The steering system (4) according to claim 15, wherein the rotor (18) of the electric motor (16) is without shaft.

17. The steering system (4) according to claim 15, wherein:
    the steering wheel (6) comprises a central hub (14) which is fixed, i.e. does not rotate around the rotation axis (13), and the outer ring (15) which can rotate around the rotation axis (13); and
    the central hub (14) of the steering wheel (6) is directly connected to the stator (17) of the electric motor (16), whereas the outer ring (15) of the steering wheel (6) is directly connected to the rotor (18) of the electric motor (16).

18. The steering system (4) according to claim 15, wherein:
    the stator (17) of the electric motor (16) has, at the center, a cable-leading through duct (27), which is coaxial to the rotation axis (13); and
    a cabling (29) is provided, which originates from the central hub (14) of the steering wheel (6) and is arranged through the cable-leading duct (27).

* * * * *